(12) United States Patent
Wu et al.

(10) Patent No.: US 10,711,768 B2
(45) Date of Patent: Jul. 14, 2020

(54) TOWER BOTTOM COOLING DEVICE FOR WIND POWER GENERATOR UNIT, AND CONTROL METHOD

(71) Applicant: JIANGSU GOLDWIND SCIENCE & TECHNOLOGY CO., LTD., Yancheng, Jiangsu (CN)

(72) Inventors: Lizhou Wu, Beijing (CN); Dazhi Pan, Beijing (CN); Mingyang Xu, Beijing (CN); Ye Li, Jiangsu (CN)

(73) Assignee: JIANGSU GOLDWIND SCIENCE & TECHNOLOGY CO., LTD, Yangeng, Jiangsu (CN)

( * ) Notice: Subject to any disclaimer, the term of this patent is extended or adjusted under 35 U.S.C. 154(b) by 108 days.

(21) Appl. No.: 15/761,956

(22) PCT Filed: Jun. 14, 2017

(86) PCT No.: PCT/CN2017/088234
§ 371 (c)(1),
(2) Date: Mar. 21, 2018

(87) PCT Pub. No.: WO2018/024039
PCT Pub. Date: Feb. 8, 2018

(65) Prior Publication Data
US 2018/0283361 A1     Oct. 4, 2018

(30) Foreign Application Priority Data
Aug. 5, 2016   (CN) .......................... 2016 1 0641196

(51) Int. Cl.
*F03D 80/60*     (2016.01)
*F03D 13/20*     (2016.01)

(52) U.S. Cl.
CPC ............. *F03D 80/60* (2016.05); *F03D 13/20* (2016.05); *F05B 2240/912* (2013.01);
(Continued)

(58) Field of Classification Search
CPC .... F03D 80/60; F03D 13/20; F05B 2240/912; F05B 2260/20; F05B 2260/64; Y02E 10/722
See application file for complete search history.

(56) References Cited

U.S. PATENT DOCUMENTS 7,482,707 B2 *   1/2009   Wobben .................. F03D 13/25
290/44
9,347,236 B2 *   5/2016   Gawrisch .............. E04H 12/003
(Continued)

FOREIGN PATENT DOCUMENTS

CN        101970869 A      2/2011
CN        102165539 A      8/2011
(Continued)

OTHER PUBLICATIONS

The First Korean Office Action dated Jun. 17, 2019; Appln. No. 10-2018-7009958.
(Continued)

*Primary Examiner* — Jon T. Schermerhorn, Jr.

(57) ABSTRACT

A tower bottom cooling device for a wind turbine includes a tower and a heat sink configured to cool a heat generating component arranged at a bottom of the tower; a main air duct is provided inside the tower, and the heat sink is disposed inside the main air duct; a first fan is arranged in the main air duct, and is configured to drive air in the main air duct to flow to cool the heat sink; and the main air duct and an external environment of the tower together form an open cycle.

14 Claims, 8 Drawing Sheets

(52) U.S. Cl.
CPC ....... *F05B 2260/20* (2013.01); *F05B 2260/64* (2013.01); *Y02E 10/722* (2013.01)

(56) References Cited

U.S. PATENT DOCUMENTS

| | | | |
|---|---|---|---|
| 2009/0045628 A1* | 2/2009 | Erdman | F03D 9/25 290/44 |
| 2010/0308596 A1 | 12/2010 | Gawrisch et al. | |
| 2011/0204652 A1* | 8/2011 | Sato | F03D 80/00 290/1 B |
| 2011/0221554 A1 | 9/2011 | Schwaiger | |
| 2011/0298218 A1* | 12/2011 | Murata | F03D 80/60 290/55 |
| 2013/0009405 A1* | 1/2013 | Sato | F03D 9/25 290/55 |
| 2014/0353977 A1* | 12/2014 | Soerensen | F03D 17/00 290/55 |

FOREIGN PATENT DOCUMENTS

| | | |
|---|---|---|
| CN | 102753822 A | 10/2012 |
| CN | 102834609 A | 12/2012 |
| CN | 203420834 U | 2/2014 |
| CN | 203476619 U | 3/2014 |
| CN | 104047811 A | 9/2014 |
| CN | 203809213 U | 9/2014 |
| CN | 104214052 A | 12/2014 |
| CN | 105179180 A | 12/2015 |
| CN | 106150929 A | 11/2016 |
| DE | 102006043936 A1 | 3/2008 |
| DE | 102015200347 A1 | 7/2015 |
| KR | 20110114427 A | 10/2011 |
| WO | 2014/035453 A2 | 3/2014 |
| WO | 2016/000715 A1 | 1/2016 |

OTHER PUBLICATIONS

International Search Report dated Sep. 14, 2017; PCT/CN2017/088234.
Extended European Search Report dated Mar. 27, 2019; Appln. No. 17836222.4.
First Chinese Office Action (with English Summary) dated Apr. 16, 2018; Appln. No. 201610641196.1.

* cited by examiner

TOWER BOTTOM COOLING DEVICE FOR WIND POWER GENERATOR UNIT, AND CONTROL METHOD

This application is the national phase of International Application No. PCT/CN2017/088234 titled "TOWER BOTTOM COOLING DEVICE FOR WIND POWER GENERATOR UNIT, AND CONTROL METHOD", filed on Jun. 14, 2017, which claims the benefit of priority to Chinese Patent Application No. 201610641196.1 titled "TOWER BOTTOM COOLING DEVICE FOR WIND TURBINE AND CONTROL METHOD THEREOF", filed with the Chinese State Intellectual Property Office on Aug. 5, 2016, the entire disclosures thereof are incorporated herein by reference.

FIELD

The present application relates to the field of wind power technology, and particularly to a cooling device for a bottom of a tower of a wind turbine and a control method of the cooling device.

BACKGROUND

With the exploitation of onshore wind resources becoming increasingly saturated, the development of wind power generation has gradually shifted to offshore areas. However, the offshore wind power generation is facing challenges such as high cost, difficult maintenance, bad environment and so on.

In order to reduce the investment cost per kilowatt of offshore wind power generation, wind turbines gradually tend to have large size. However, increasing the single-machine power will increase heat generation of sub-components and increase the number of components requiring active heat dissipation.

Currently, the heat generating components in a high-power wind turbine are often equipped with independent heat dissipation systems. This decentralized cooling manner involves not only high costs, but also many trouble spots, and further, the high humidity offshore environment may be apt to cause condensation, resulting in short circuit in the electronic elements. In addition, the offshore wind turbine maintenance is difficult, the frequency of offshore maintenance should not be too high, and thus the system is required to have a high reliability.

In view of this issue, the invention patent application with publication No. CN105179180A discloses a cooling system for a bottom of a tower of a high-power offshore wind turbine, in which, a heat sink for an inverter and a heat sink for a box transformer are integrally designed and share one heat sink system, and the heat sink system is placed outside the tower, further, a closed cycle air path system is arranged in the spaces of the three layers of the tower which is provided for placing electric cabinets, to control the temperature and humidity in the spaces of the three layers at a lower part of the tower.

However, in this technical solution, the heat sinks are externally disposed, which takes more time in hoisting and takes up more space, and especially for an offshore wind turbine, it may occupy more space of a base external platform, thus increasing construction costs of the base external platform. Moreover, since the heat sinks are externally disposed, it is further required to cut more holes in the tower for laying water inlet pipes and water outlet pipes of the water-cooling heat sink and cables for providing power to water-cooling fans. In addition, this technical solution can only control the temperature and humidity in the closed spaces in the three layers of the lower part of the tower, and can not adjust the temperature and humidity of other spaces in the tower.

Furthermore, although a closed cycle air loop is provided in the spaces of the three layers at the bottom of the tower, in fact, operation and maintenance personnel need to enter the spaces to perform operations. When personnel enter and exit, it is inevitably to introduce external air (with salt spray and high humidity) into the spaces, and in addition, to satisfy the survival needs of personnel in their work, the space cannot be completely sealed in the operation of personnel (since the personnel need oxygen in breathing), therefore, it is hard to control the air cleanliness of the closed cycle air path system in the three layers.

Therefore, a technical issue to be addressed by the person skilled in the art is to overcome the above disadvantages of the tower bottom cooling device for the wind turbine.

SUMMARY

An object of the present application is to provide a tower bottom cooling device for a wind turbine. The cooling device has a heat sink disposed inside the tower, which can improve the integration of the heat dissipation system, and can reduce the construction cost of a base external platform and the time required for offshore hoisting for an offshore wind turbine, and also can reduce the number of holes cut in the tower for allowing water inlet pipes, water outlet pipes and cables to pass through and reduce the sealing issue caused accordingly.

Another object of the present application is to provide a control method for the above tower bottom cooling device for the wind turbine.

In order to achieve the above objects, a tower bottom cooling device for a wind turbine is provided according to the present application, which includes a tower and a heat sink configured to cool a heat generating component arranged at a bottom of the tower, a main air duct is provided inside the tower, and the heat sink is disposed inside the main air duct; a first fan is arranged in the main air duct, and is configured to drive air in the main air duct to flow to cool the heat sink; and the main air duct and an external environment of the tower together form an open cycle.

Preferably, the tower is provided with an air inlet and an air outlet, and taking the heat sink as a boundary, a passageway from the air inlet to the heat sink form an air inlet section, a passageway from the heat sink to the air outlet form an air outlet section, and the air inlet section, the heat sink and the air outlet section constitute the main air duct.

Preferably, the tower is provided with a tower door and a layering platform corresponding to the tower door, and the air inlet is arranged in a side wall of a lower space below the layering platform.

Preferably, a first ventilation pipe is provided between the heat sink and the first fan, and a second ventilation pipe is provided between the first fan and the air outlet.

Preferably, the tower door is a double layer door, a first door of the double layer door is a full-open door, a second door of the double layer door is an airtight door; the full-open door forms the air outlet, and a passageway is defined by a top portion and side walls of the full-open door and the airtight door and is in communication with the air outlet.

Preferably, the heat sink and the first fan are arranged in the lower space below the layering platform.

Preferably, the first fan include two or more fans, and air outlets of the first fans are respectively connected to a lower bottom surface of the double layer door via corresponding second ventilation pipes to form passageways.

Preferably, the heat sink and the first fan are arranged in an upper space above the layering platform, and a third ventilating pipe is provided between the air inlet and the heat sink.

Preferably, the air outlet of the first fan is connected to a top portion of the double layer door to form a passageway.

Preferably, the main air duct is provided with a bypass air duct; a second fan is provided in the bypass air duct, an air duct switching device is provided at an air inlet of the bypass air duct, and an air outlet of the bypass air duct opens to the upper space above the layering platform.

Preferably, the air duct switching device has a first operating state, a second operating state and a third operating state, in the first operating state, the bypass air duct is in communication with the air inlet section of the main air duct and is closed with respect to the air outlet section of the main air duct;

in the second operating state, the bypass air duct is in communication with the air outlet section of the main air duct and is closed with respect to the air inlet section of the main air duct; and in the third operating state, the bypass air duct is closed with respect to both the air inlet section and the air outlet section of the main air duct.

Preferably, a salt spray filter is provided in the bypass air duct.

Preferably, a dehumidifier and/or an electric heating device is further provided in the bypass air duct.

Preferably, the bypass air duct is provided with a one-way valve, a first air inlet configured to communicate with the air inlet section of the main air duct, and a second air inlet configured to communicate with the air outlet section of the main air duct; the air duct switching device includes a cover plate and a motor configured to drive the cover plate to rotate by a rotating shaft, the cover plate is fixed to the rotating shaft, and the rotating shaft is connected to the motor;

in the first operating state, the one-way valve is switched on, and the motor drives the cover plate to rotate to a position for closing the second air inlet;

in the second operating state, the one-way valve is switched on, and the motor drives the cover plate to rotate to a position for closing the first air inlet; and in the third operating state, the one-way valve is switched off.

Preferably, the bypass air duct is provided with a first air inlet configured to communicate with the air inlet section of the main air duct, and a second air inlet configured to communicate with the air outlet section of the main air duct; the air duct switching device includes a first one-way valve arranged at the first air inlet and a second one-way valve arranged at the second air inlet;

in the first operating state, the first one-way valve is switched on and the second one-way valve is switched off;

in the second operating state, the second one-way valve is switched on and the first one-way valve is switched off; and in the third operating state, both the first one-way valve and the second one-way valve are switched off.

Preferably, air flow in the main air duct is redirected, the air inlet section of the main air duct is turned into an air outlet section, and the air outlet section of the main air duct is turned into an inlet air section.

In order to achieve the above second object, a control method is provided according to the present application for controlling the tower bottom cooling device for the wind turbine in each of the foregoing various solutions, and in the method, a temperature sensor is provided at a water inlet of the heat sink, and the control method includes:

turning off the first fan when $T_{(water,\ in)}$ is lower than a set temperature value; and starting the first fan when $T_{(water,\ in)}$ is higher than a set temperature value; and wherein $T_{(water,\ in)}$ is a temperature value measured by the temperature sensor.

In order to achieve the above second object, another control method is provided according to the present application for controlling the tower bottom cooling device for the wind turbine in each of the foregoing various solutions, in the method, a temperature sensor and a humidity sensor are arranged in a space at the bottom of the tower to which the bypass air duct opens, the control method includes:

when T is higher than a set temperature value, switching the air duct switching device to introduce cold air from the air inlet section of the main air duct, filtering the cold air, and supplying the filtered cold air to the internal environment of the tower, to cool the internal environment of the tower;

when RH is higher than a set relative humidity value and T is lower than a set temperature value, switching the air duct switching device to introduce hot air from the air outlet section of the main air duct, filtering the hot air, and supplying the filtered hot air to the internal environment of the tower, to reduce the relative humidity of the internal environment of the tower; and when RH is higher than a set relative humidity value and T is higher than a set temperature value, switching the air duct switching device to introduce cold air from the air inlet section of the main air duct, filtering the cold air, and supplying the filtered cold air to the internal environment of the tower, to cool the internal environment of the tower and reduce the relative humidity of the internal environment of the tower; and wherein T is a value measured by a single temperature sensor or a maximum value among values measured by multiple temperature sensors, and RH is a value measured by a single humidity sensor or a maximum value among values measured by multiple humidity sensors.

In the present application, the main air duct is arranged inside the tower, and the heat sink for the primary heat generating components at the bottom of the tower is placed in the main air duct. Since the heat sink is internally disposed, the assembly can be done at the dock, thus reducing the time required for offshore hoisting. Also, since the heat sink is no longer disposed on the tower external platform, the size of the tower external platform is reduced. In addition, since the heat sink is disposed internally, the water inlet pipes, the water outlet pipes and the cables are not required to pass through the tower wall, thereby improving the tightness of the tower.

In a preferred embodiment, with the design of the double layer door, the number and areas of holes cut in the tower wall can be effectively reduced on the condition that the cross sectional area for ventilation required by each of the air inlet and the air outlet is ensured.

In another preferred embodiment, the bypass air duct composed of the air duct switching device, the second fan, the salt spray filter, and the like is provided, thus, it is possible to introduce cold air from the air inlet section of the main air duct to cool the air in the tower or to introduce hot air from the air outlet section of the main air duct to reduce the relative humidity inside the tower according to the operation condition requirements.

| Reference Numerals in FIGS. 1 to 14: | | | |
|---|---|---|---|
| 1 | tower, | 2 | heat sink, |
| 3 | tower door, | 31 | first door, |
| 32 | second door, | 4 | layering platform, |
| 5 | first ventilation pipe, | 6 | first fan, |
| 7 | air inlet, | 8 | foot plate, |
| 9 | second ventilation pipe, | 10 | air outlet, |
| 11, 11' | air duct switching device, | 111, 111' | casing, |
| 112 | stepping motor, | 113 | rotating shaft, |
| 114 | cover plate, | 115 | one-way valve, |
| 116 | first air inlet, | 117 | second air inlet, |
| 12 | salt spray filter, | 13 | second fan, |
| 112' | first one-way valve, | 113' | second one-way valve, |
| 14 | third ventilation pipe. | | |

DETAILED DESCRIPTION

In order to enable the person skilled in the art to better understand the solutions of the present application, the present application is further described in detail below with reference to the drawings and embodiments.

The tower bottom cooling device for the wind turbine according to the present application is mainly composed of two parts: a main air duct and a bypass air duct. The main air duct and the external air together form an open cycle, to introduce a large amount of unfiltered cold air from the outside of the tower, mainly for heat dissipation. The cold air flows through a heat sink in the main air duct, and then is discharged out of the tower. A bypass air duct is configured to introduce some of the air from the main air duct, filter the air and then provide the filtered air to the internal environment of the tower. The configurations and operations of the two air ducts are described separately below.

Figure 1:
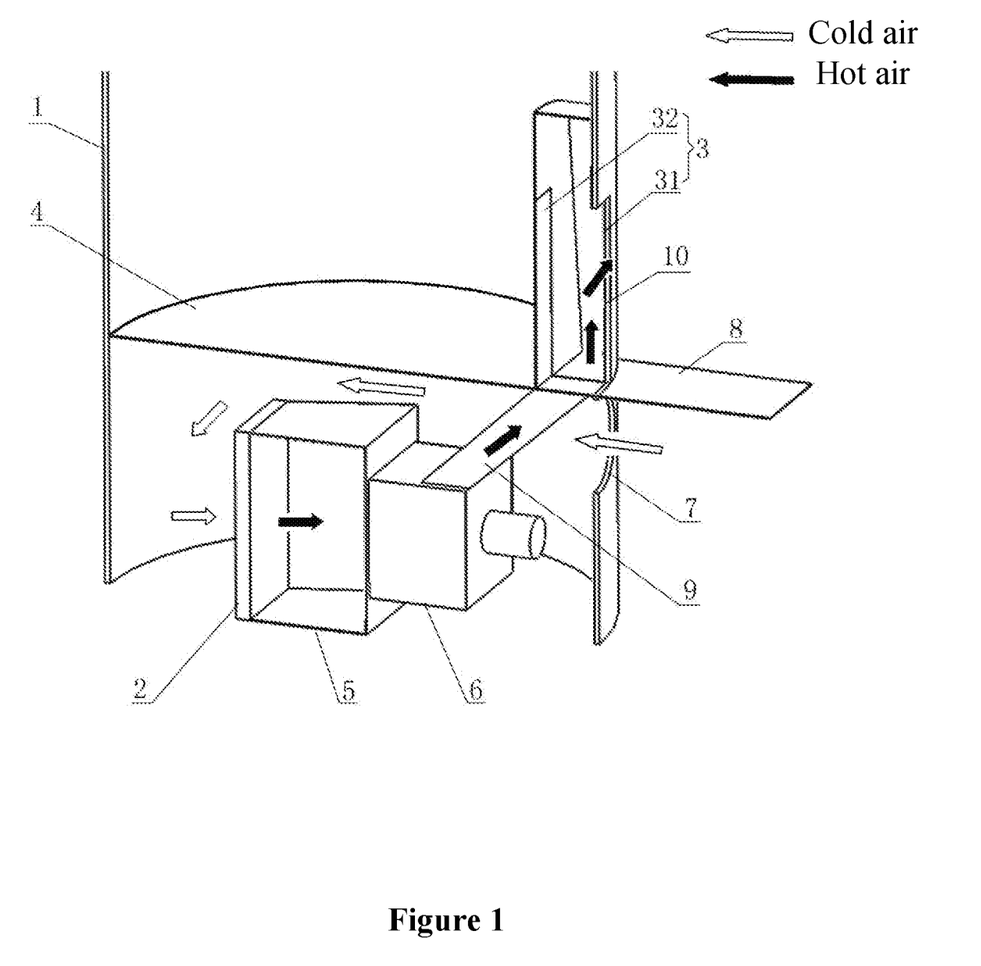
FIG. 1 is a half sectional view of a tower bottom cooling device for a wind turbine disclosed in an embodiment of the present application.
Figure 2:
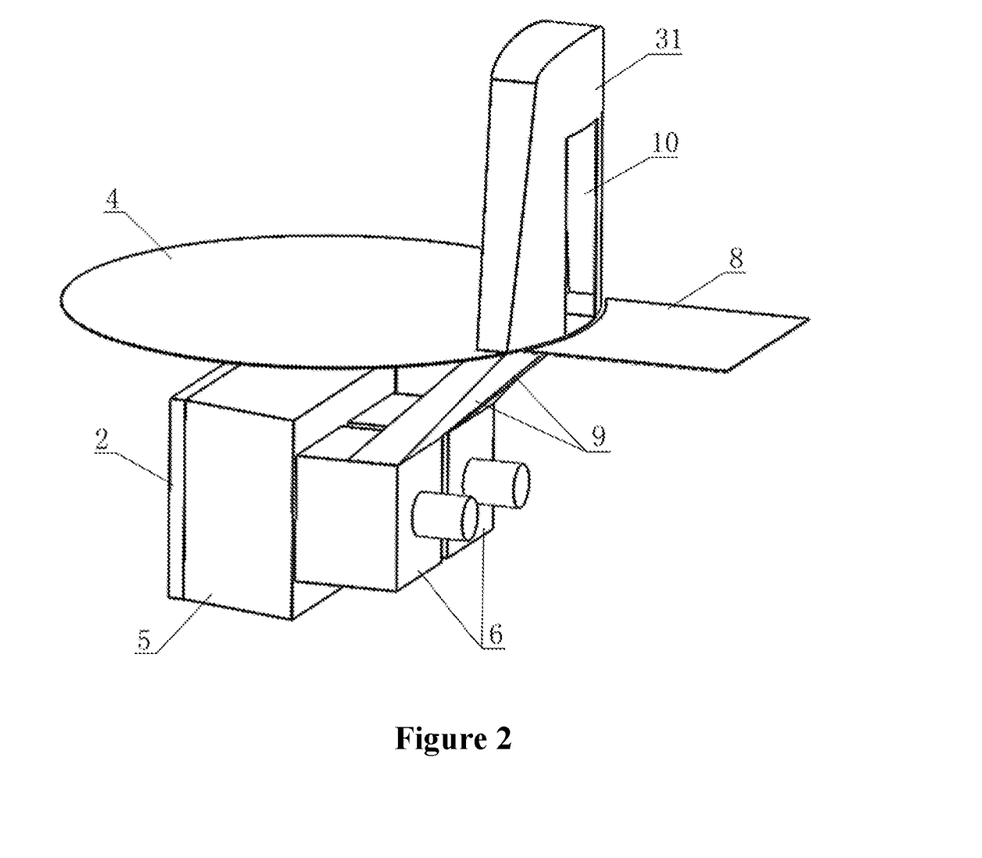
FIG. 2 is an isometric view of the tower bottom cooling device for the wind turbine in FIG. 1 (the tower is omitted in the figure)
Figure 3:
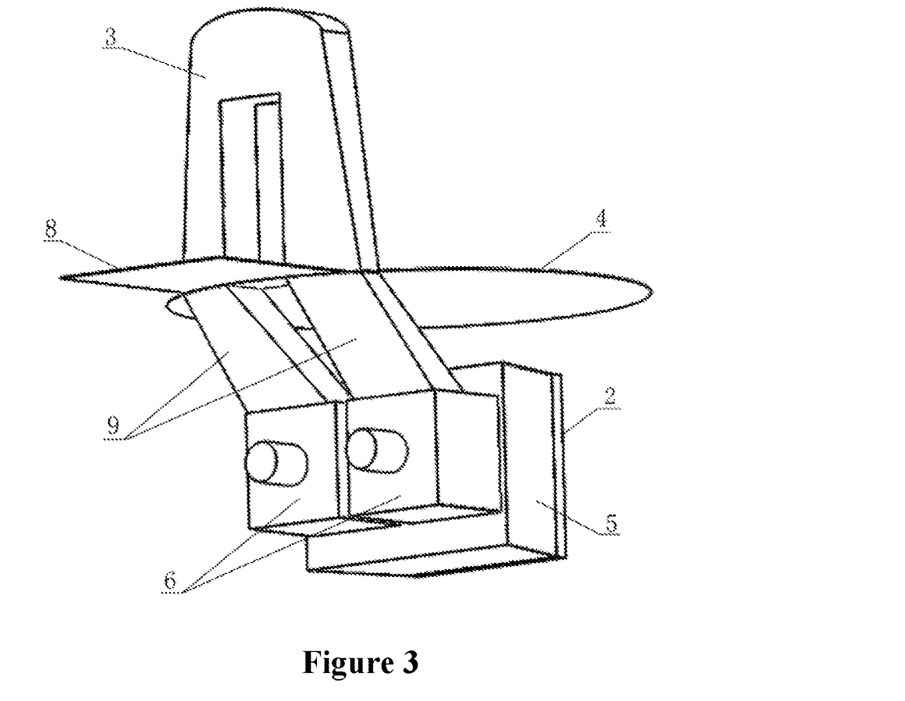
FIG. 3 is an isometric view of the tower bottom cooling device for the wind turbine in FIG. 1 viewed from another angle (the tower is also omitted in the figure)

Referring to FIGS. 1, 2, and 3, FIG. 1 is a half-sectional view of the tower bottom cooling device for the wind turbine disclosed in an embodiment of the present application; FIG. 2 is an isometric view of the tower bottom cooling device for the wind turbine in FIG. 1; and FIG. 3 is an isometric view of the tower bottom cooling device for the wind turbine in FIG. 1 viewed from another angle.

As shown in the figures, main heat generating components at the bottom of the tower (typically, for example, a box transformer, an inverter, and the like at the bottom of the tower of the wind turbine) carry heat to a heat sink 2 (typically, for example, a water-air heat exchanger) through a water-cooling heat dissipation system to dissipate heat. The heat sink 2 is placed inside the tower 1, specifically, in a lower space below a layering platform 4 on which a tower door 3 is located, and the lower space is named as an under first layer, and the under first layer is isolated and sealed from other spaces of the upper layers of the tower. In the direction of air flow, the heat sink 2 is located in front of a first ventilation pipe 5, and a first fan 6 is installed behind the first ventilation pipe 5.

The tower door 3 is embodied as a double layer door, a first door 31 has a full-open structure to form an air outlet 10, a second door 32 is embodied as an airtight door, and a passageway defined by a top portion and side walls of the space between the two doors is in communication with the air outlet 10. The first fan 6 is a centrifugal fan, and there are two of the centrifugal fans, air outlets of the two centrifugal fans are respectively connected to a lower bottom surface of the double layer door to form passageways. An air inlet 7 is located in a side wall of the tower below the foot plate 8.

It should be noted here that the number of the first fan 6 may also be one, and in this case, the air outlet is divided into two ways respectively connected to the lower bottom surface of the double layer door to form passageways; or, more than two centrifugal fans are used.

Taking the heat sink 2 as a boundary, the air inlet 7 and the space of the under first layer function as an air inlet section. The first ventilation pipe 5 behind the heat sink 2, the two centrifugal fans, two second ventilation pipes 9 for connecting the two centrifugal fans to the lower bottom surface of the double layer door, the passageway in the double layer door and the air outlet 10 form an air outlet section. The air inlet section, the heat sink 2 and the air outlet section constitute the entire main air duct. The first fans 6 in the air outlet section are configured to drive the air in the main air duct to flow, to allow the external cold air to enter from the air inlet 7 continuously, and the cold air flows through the air inlet section, cools the heat sink 2 to turn into hot air, then flows through the air outlet section, and finally flows out through the air outlet 10. The entire main air duct and the air outside the tower form a cycle, to continuously cool the heat sink 2 in the main air duct.

Figure 4:
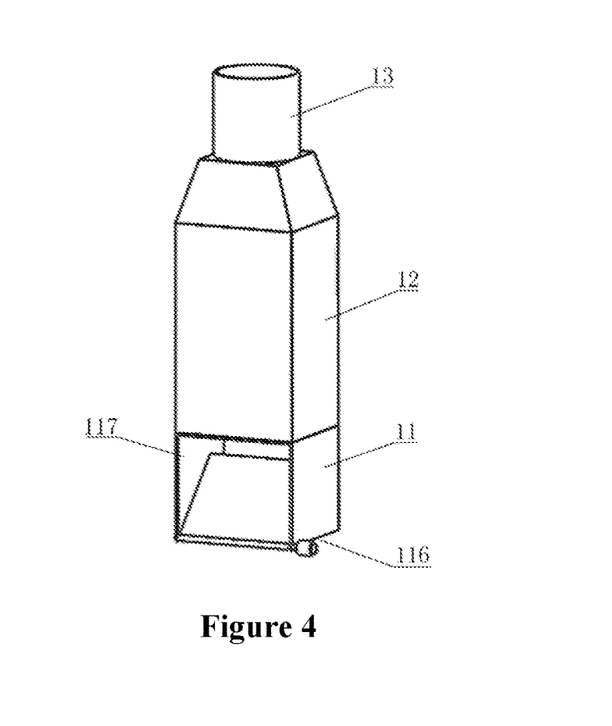
FIG. 4 is a schematic view showing the structure of a bypass air duct disclosed in an embodiment of the present application.
Figure 5:
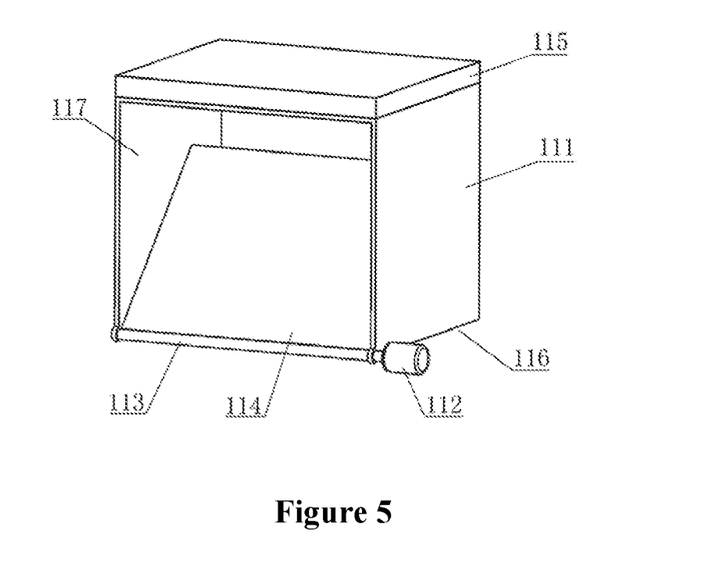
FIG. 5 is a schematic view of an air duct switching device disclosed in an embodiment of the present application.

Referring to FIGS. 4 and 5, FIG. 4 is a schematic view showing the structure of a bypass air duct disclosed in an embodiment of the present application; and FIG. 5 is a schematic view of an air duct switching device disclosed in an embodiment of the present application.

As shown in the figures, an air inlet of the bypass air duct is provided with an air duct switching device 11 configured to decide whether the bypass air duct introduces air (cold air) from the air inlet section of the main air duct or introduces air (hot air) from the air outlet section of the main air duct. A salt spray filter 12 and a second fan 13 are arranged behind the air duct switching device 11. The salt spray filter 12 is configured to remove liquid droplets and salt particles in the air, the second blower 13 is configured to drive the air in the bypass air duct to flow, to enable part of air introduced from the main air duct to flow through the air duct switching device 11, the salt spray filter 12 and the second fan 13, to provide this part of air to the internal environment of the tower 1.

Figure 10:
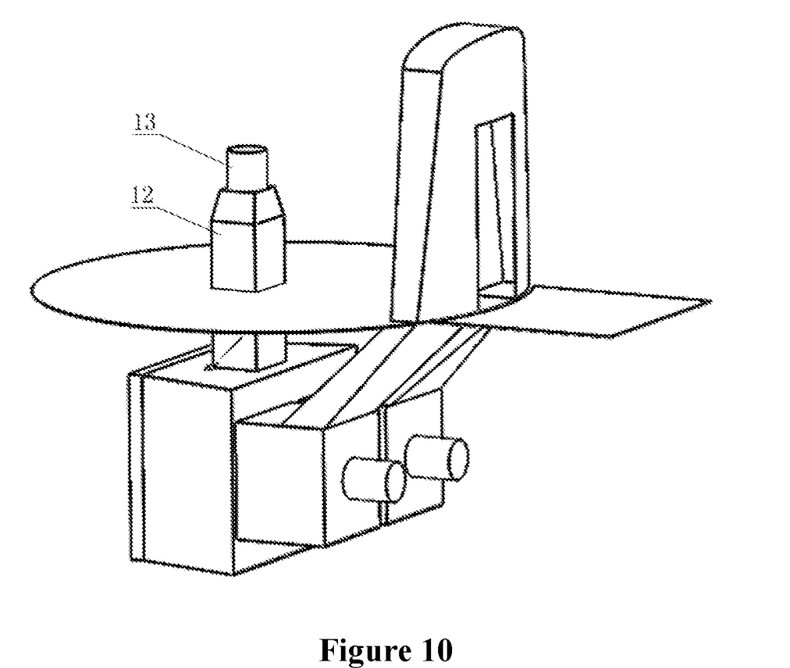
FIG. 10 is a schematic view showing the position of a bypass air duct in a main air duct.
Figure 11:
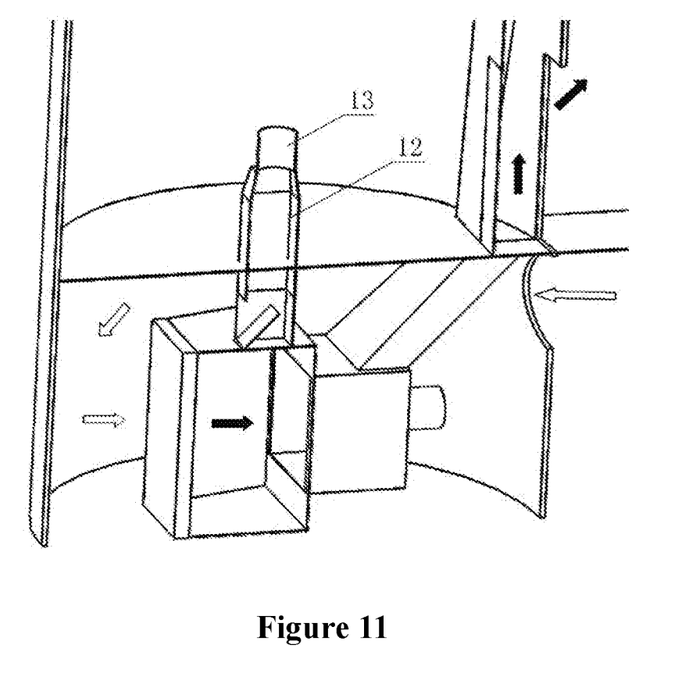
FIG. 11 is a schematic diagram of the air path of the bypass air duct in FIG. 10.

Referring to FIGS. 10 and 11, FIG. 10 is a schematic view showing the position of the bypass air duct in the main air duct; and FIG. 11 is a schematic diagram of air path of the bypass air duct in FIG. 10.

The air duct switching device 11 is mainly composed of a casing 111, a stepping motor 112, a rotating shaft 113, a cover plate 114, a one-way valve 115 and the like. The cover plate 114 is fixed to the rotating shaft 113, and the rotating shaft 113 is connected to the stepping motor 112. In switching, the stepping motor 112 rotates, to drive the rotating shaft 113 and the cover plate 114 to rotate together, to open one air inlet and close another air inlet at the same time, thereby realizing the air inlet switching. The two air inlets are a first air inlet 116 and a second air inlet 117 respectively, the first air inlet 116 is located at a lower end of the casing 111, the second air inlet 117 is located at a lateral side of the casing 111, and the one-way valve 115 is located at the top of the casing 111 and is downstream the first air inlet 116 and the second air inlet 117 in the air flow direction. When the bypass air duct does not need to introduce air from the main air duct, the one-way valve 115 is closed. The mode of switching between the cold air and the hot air is described as follows.

When the one-way valve 115 is switched on, the stepping motor 112 acts to drive the cover plate 114 to rotate downwards. At this time, the first air inlet 116 (i.e., the hot air inlet) is closed and the second air inlet 117 (i.e., the cold air inlet) is opened, and thus the air duct switching device introduces cold air into the bypass air duct.

When the one-way valve 115 is switched on, the stepping motor 112 acts to drive the cover plate 114 to rotate upwards. At this time, the first air inlet 116 is closed and the second air inlet 117 is opened, and thus the air duct switching device introduces hot air into the bypass air duct.

When the one-way valve 115 is switched off, the air duct switching device 11 stops introducing cold air or hot air into the bypass air duct.

Figure 6:
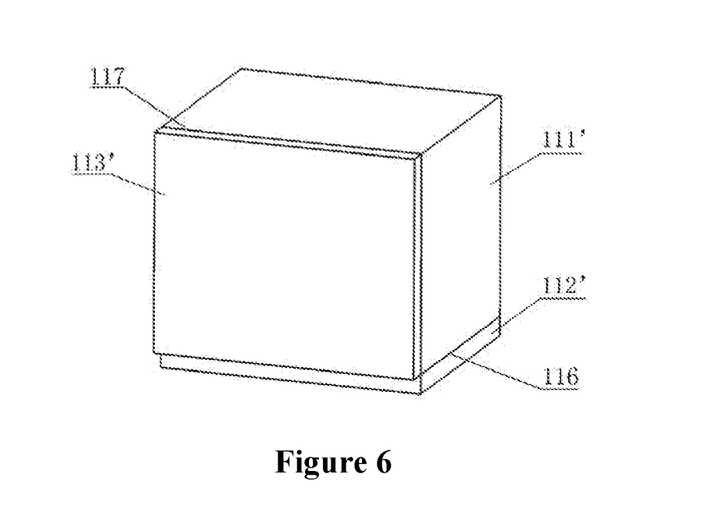
FIG. 6 is a schematic view of another kind of air duct switching device disclosed in an embodiment of the present application.

Of course, the air duct switching device 11 may also be implemented in other ways. As shown in FIG. 6, the air duct switching device 11' is mainly composed of a casing 111' and two one-way valves. A first one-way valve 112' is arranged at the first air inlet 116 and a second one-way valve 113' is arranged at the second air inlet 117. In switching, one one-way valve is switched on and the other one-way valve is switched off, thereby achieving the air inlet switching. When the bypass air duct does not need to introduce air from the main air duct, both of the two one-way valves are closed, and the mode of switching between the cold air and the hot air is described as follows.

When the first one-way valve 112' is switched on and the second one-way valve 113' is switched off, the first air inlet 116 is opened and the second air inlet 117 is closed. The air duct switching device introduces hot air into the bypass air duct.

When the second one-way valve 113' is switched on and the first one-way valve 112' is switched off, the second air inlet 117 is opened, the first air inlet 116 is closed, and the air duct switching device introduces cold air into the bypass air duct.

When the first one-way valve 112' and the second one-way valve 113' are both switched off, the air duct switching device stops introducing cold air or hot air into the bypass air duct.

Here, an electric heating device may be additionally installed in the bypass air duct for heating the air when the temperature of the hot air introduced from the main air duct is not high enough, so as to reduce the relative humidity of the internal environment of the tower. The electric heating device may be integrated into the salt spray filter 12. Moreover, for achieving a better dehumidification effect, a dehumidifier can also be additionally installed.

The top portion and the side walls of the double layer door may be provided with louvers. When discharging air through the air outlet 10, the louvers are opened. When it is not required to discharge air through the air outlet 10, the louvers are closed to prevent the ingress of rainwater and debris. A filter screen may be further provided, for preventing ingress of foreign matters. The foot plate 8 is provided to allow operation and maintenance personnel to stand in front of the tower door, and to separate the air inlet from the air outlet, to prevent "thermal short circuit". In order to prevent "thermal short circuit", the air inlet 7 may be staggered from the tower door 3 in a circumferential direction, rather being arranged directly below the tower door. At the air inlet in the side wall of the tower below the foot plate 8, a louver may be provided, a filter screen may further be provided, and a water fender may also be provided, and a combinations of these forms is also practical.

Figure 7:
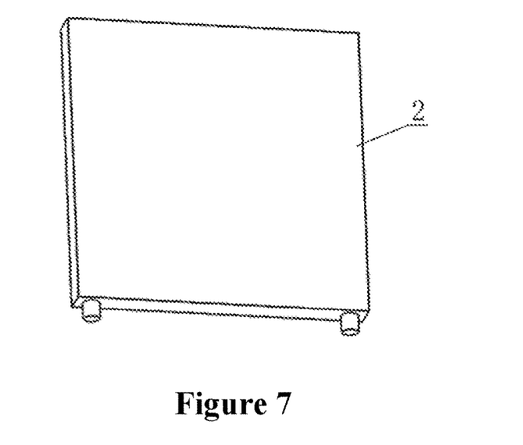
FIG. 7 is a schematic view showing the structure of an integral type heat sink.
Figure 8:
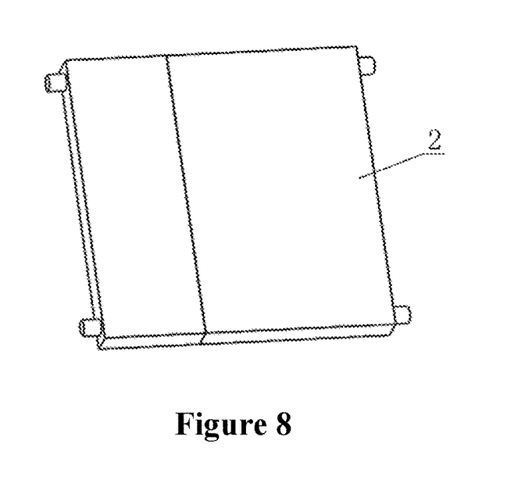
FIG. 8 is a schematic view showing the structure of a combined type heat sink.
Figure 9:
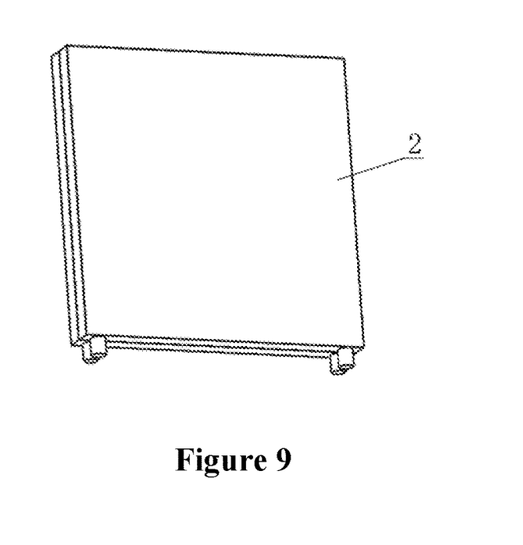
FIG. 9 is a schematic view showing the structure of a series type heat sink.

Referring to FIGS. 7, 8 and 9, FIG. 7 is a schematic view showing the structure of an integral type heat sink; FIG. 8 is a schematic view showing the structure of a combined type heat sink; and FIG. 9 is a schematic view showing the structure of a series type heat sink.

As shown in the figures, the heat sink 2 in the main air duct can be implemented in three manners according to the different water-cooling heat dissipation systems used for the primary heat generating components (typically, for example, a box transformer, an inverter at the bottom of the tower) at the bottom of the tower.

In the case that the water cooling system used for the primary heat generating components at the bottom of the tower is a centralized cooling system (typically, for example, one water-cooling heat dissipation system shared by the box transformer and the inverter), the heat sink 2 in the main air duct is embodied as an integral type heat sink.

In the case that the water cooling system used for the primary heat generating components at the bottom of the tower is a distributed cooling system (typically, for example, the box transformer and the inverter have respective water-cooling heat dissipation systems), the heat sink 2 in the main air duct can be embodied as a combined type heat sink or a series type heat sink.

The combined type heat sink is formed by installing multiple heat sinks side by side, the cooling air passes through each of the heat sinks, and the heat sinks are independent of each other, each of the heat sinks has its own independent water inlet pipe and water outlet pipe. The series type heat sink has multiple heat sinks connected in series and installed together, the cooling air flows sequentially through each of the heat sinks, and the heat sinks are independent of each other, and each of the heat sinks has its own independent water inlet pipe and water outlet pipe.

In summary, in the present application, the heat sink 2 (typically, for example, a water-air heat exchanger used to dissipate heat from the box transformer and an inverter) originally placed outside the tower 1 is instead disposed inside the tower 1, thus the integration level of the system may be improved, and for offshore wind turbines, the construction costs of the base external platform will be reduced (since the base external platform can be made small), and the time required for offshore hoisting may be reduced (since in the current offshore hoisting, the externally installed heat sink cannot be hoisted until the hoisting of the tower is finished, and moreover, the required water inlet pipes and water outlet pipes and cables are to be mounted offshore, which needs much more offshore operation time, however, with the heat sink being disposed internally, the assembling can be finished at the dock, therefore, it does not need to spend time in mounting the heat sink offshore). Moreover, with the heat sink 2 being disposed inside the tower 1, the number of holes cut in the tower 1 to allow the water inlet pipes, water outlet pipes and cables to pass through may be reduced and the sealing issue caused accordingly may also be reduce. In addition, the top portion and side walls of the double layer door are employed to be in communication with the air outlet 10, which can effectively reduce the number and areas of the holes cut in the tower wall on the condition of ensuring the cross sectional area for ventilation of each of the air inlet and the air outlet required by the main air duct. Moreover, the bypass air duct is provided beside the main air duct, and can, according to operation condition requirements, introduce part of air from the main air duct, filter the air and then provide the filtered air to the internal environment of the tower 1. When the temperature of the internal environment of the tower 1 is higher than a set value, cold air is introduced into the bypass air duct from the air inlet section of the main air duct by the air duct switching device 11, 11', and after being filtered, the cold air is used to cool the internal environment of the tower 1. In the case that the relative humidity inside the tower 1 is higher than a set value, hot air is introduced into the bypass air duct from the air outlet section of the main air duct by the air duct switching device 11, 11', and after being filtered, the hot air is used to reduce the relative humidity of the internal environment of the tower 1.

Figure 12:
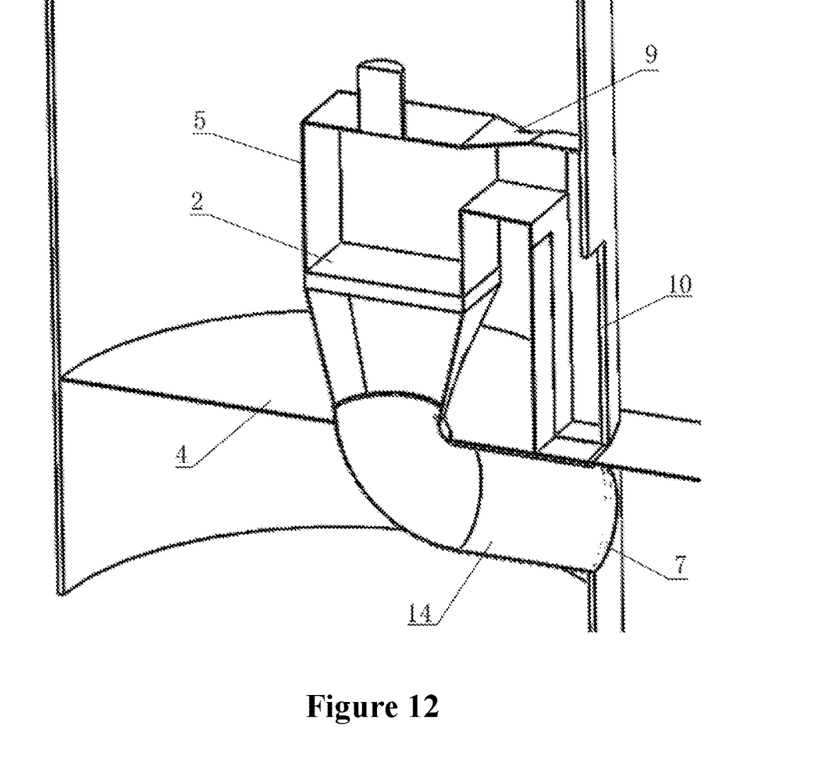
FIG. 12 is a half sectional view of a second type of tower bottom cooling device for the wind turbine disclosed in an embodiment of the present application.
Figure 13:
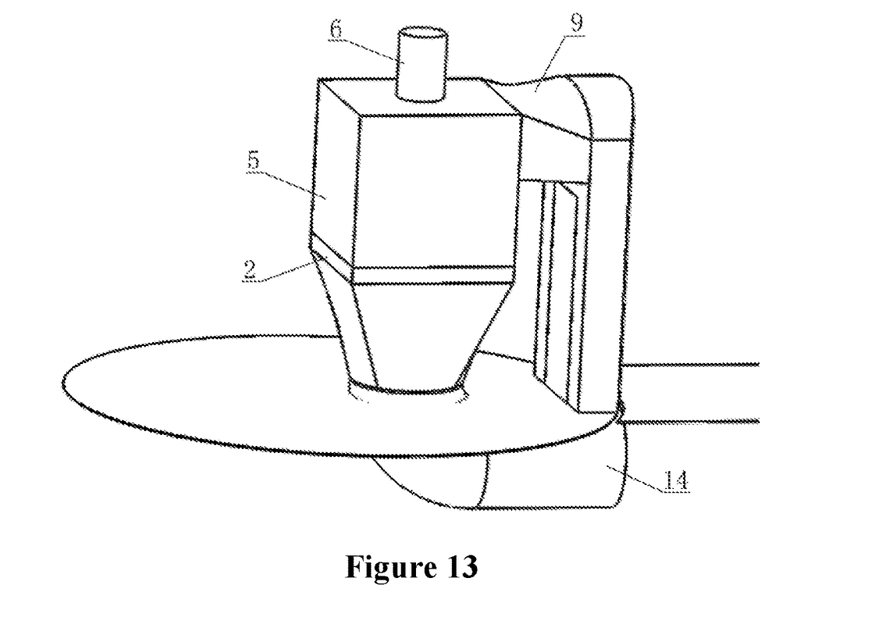
FIG. 13 is an isometric view of the tower bottom cooling device for the wind turbine in FIG. 12 (the tower is omitted in the figure)
Figure 14:
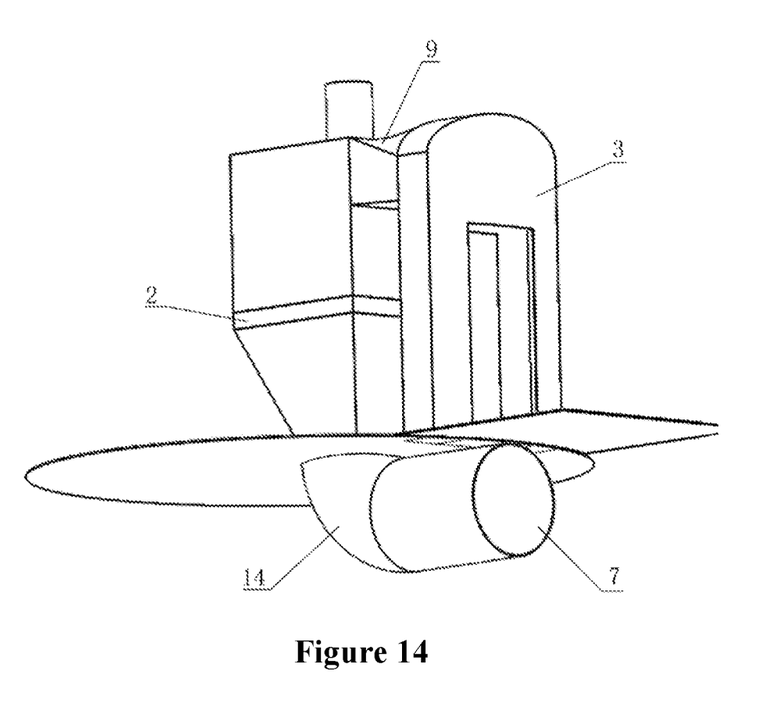
FIG. 14 is an isometric view of the tower bottom cooling device for the wind turbine in FIG. 12 viewed from another angle (the tower is also omitted).

Referring to FIGS. 12, 13 and 14, FIG. 12 is a half sectional view of a second type of tower bottom cooling device for the wind turbine disclosed in an embodiment of the present application; FIG. 13 is an isometric view of the tower bottom cooling device for the wind turbine in FIG. 12; and FIG. 14 is an isometric view of the tower bottom cooling device for the wind turbine in FIG. 12 viewed from another angle.

In another embodiment, the heat sink 2 may be located in a space above the layering platform 4 corresponding to the tower door 3, the heat sink 2 is in communication with the air inlet 7 via a third ventilation pipe 14, the first fan 6 is arranged behind the heat sink 2 (the position of the first fan is shown in the figure and the fan itself is not drawn). The first door 31 still forms the air outlet 10 which is in communication with the passageway defined by the top portion and the side walls of the double layer door, and the air inlet 7 is still formed in the side wall of the tower below the foot plate 8. Taking the heat sink 2 as a boundary, the air inlet and the third ventilation pipe 14 function as the air inlet section. The first ventilation pipe 5 behind the heat sink 2, the first fan 6, the second ventilation pipe 9, the passageway inside the double layer door and in communication with the second ventilation pipe 9, and the air outlet 10 form the air outlet section. The air inlet section, the heat sink 2 and the air outlet section constitute the entire air duct, and the rest of structure is substantially the same as that in the first embodiment, which can refer to the above description.

The foregoing embodiments are merely preferred solutions of the present application, and the present application is not limited to this. On this basis, specific adjustments may be made according to practical requirements to obtain different embodiments. For example, the centrifugal fan may also be located in the air inlet section. Or, the second fan 13 in the bypass air duct may be an axial flow fan or a centrifugal fan. Or, the air flow in the main air duct may flow reversely, to turn the air inlet section into the air outlet section, and the air outlet section into the air inlet section, and so on. There are many implementation ways, which will not be listed one by one here.

In addition to the tower bottom cooling device for the wind turbine described above, a control method for controlling the cooling device is also provided according to the present application, which includes main air duct control and bypass air duct control as follows.

1) Main Air Duct Control:

A temperature sensor is provided at a water inlet of the heat sink 2 in advance, and a temperature value measured by the temperature sensor is represented by $T_{(water, in)}$.

When $T_{(water, in)}$ is lower than a set temperature value, the first fan is turned off.

When $T_{(water, in)}$ is higher than a set temperature value, the first fan is started.

2) Bypass Duct Control:

Temperature sensors and humidity sensors are provided in advance in spaces of several layers at the bottom of the tower 1 respectively. Typically, temperature sensors and humidity sensors are provided in the spaces of the three layers at the bottom of the tower. Temperature values measured by the temperature sensors are respectively represented by $T_1$, $T_2$ and $T_3$, and relative humidity values measured by the humidity sensors are respectively represented by $RH_1$, $RH_2$, $RH_3$.

When max $(T_1, T_2, T_3)$ is higher than a set temperature value, the air duct switching device 11, 11' is switched to introduce cold air from the air inlet section of the main air duct, and the cold air is filtered and then supplied to the internal environment of the tower, to cool the internal environment of the tower.

When max $(RH_1, RH_2, RH_3)$ is higher than a set relative humidity value and max $(T_1, T_2, T_3)$ is lower than a set temperature value, the air duct switching device 11, 11' is switched to introduce hot air from the air outlet section of the main air duct, and the hot air is filtered and then supplied to the internal environment of the tower, to reduce the relative humidity of the internal environment of the tower.

When max $(RH_1, RH_2, RH_3)$ is higher than a set relative humidity value and max $(T_1, T_2, T_3)$ is higher than a set temperature value, the air duct switching device 11, 11' is switched to introduce cold air from the air inlet section of the main air duct, and the cold air is filtered and then supplied to the internal environment of the tower, to cool the internal environment of the tower and reduce the relative humidity of the internal environment of the tower.

In the present application, the main air duct is arranged inside the tower, and the heat sink for the primary heat generating components at the bottom of the tower is placed in the main air duct. Since the heat sink is internally disposed, the assembly can be done at the dock, thus reducing the time required for offshore hoisting. Also, since the heat sink is no longer disposed on the tower external platform, the size of the tower external platform is reduced. In addition, since the heat sink is disposed internally, the water inlet pipes, the water outlet pipes and the cables are not required to pass through the tower wall, thereby improving the tightness of the tower.

In addition, with the design of the double layer door, the number and areas of holes cut in the tower wall can be effectively reduced on the condition that the cross sectional area for ventilation required by each of the air inlet and the air outlet is ensured.

By further providing the bypass air duct composed of the air duct switching device, the second fan, the salt spray filter, and the like, it is possible to introduce cold air from the air inlet section of the main air duct to cool the air in the tower or to introduce hot air from the air outlet section of the main air duct to reduce the relative humidity inside the tower depending on the operation condition requirements.

The tower bottom cooling device for the wind turbine and the control method according to the present application are described in detail hereinbefore. The principle and the embodiments of the present application are illustrated herein by specific examples. The above description of examples is only intended to help the understanding of the core concept of the present application. It should be noted that, for the person skilled in the art, a few of modifications and improvements may be made to the present application without departing from the principle of the present application, and these modifications and improvements are also deemed to fall into the scope of protection of the present application defined by the claims.

What is claimed is:

1. A tower bottom cooling device for a wind turbine, comprising a tower and a heat sink, the heat sink being configured to cool a heat generating component arranged at a bottom of the tower, wherein a main air duct is provided inside the tower, and the heat sink is disposed inside the main air duct; a first fan is arranged in the main air duct, and is configured to drive air in the main air duct to flow to cool the heat sink; and the main air duct and an external environment of the tower together form an open cycle; and the tower is provided with an air inlet and an air outlet, and taking the heat sink as a boundary, a passageway from the air inlet to the heat sink form an air inlet section of the main air duct, and a passageway from the heat sink to the air outlet form an air outlet section of the main air duct; and the tower is provided with a tower door and a layering platform corresponding to the tower door, and the air inlet is arranged in a side wall of a lower space below the layering platform;

the main air duct is provided with a bypass air duct; a second fan is provided in the bypass air duct, an air duct switching device is provided at an air inlet of the bypass air duct, and an air outlet of the bypass air duct opens to the upper space above the layering platform; and wherein, the air duct switching device has a first operating state, a second operating state and a third operating state;

in the first operating state, the bypass air duct is in communication with the air inlet section of the main air duct and is closed with respect to the air outlet section of the main air duct;

in the second operating state, the bypass air duct is in communication with the air outlet section of the main air duct and is closed with respect to the air inlet section of the main air duct; and in the third operating state, the bypass air duct is closed with respect to both the air inlet section and the air outlet section of the main air duct.

2. The tower bottom cooling device for the wind turbine according to claim 1, wherein a first ventilation pipe is provided between the heat sink and the first fan, and a second ventilation pipe is provided between the first fan and the air outlet.

3. The tower bottom cooling device for the wind turbine according to claim 2, wherein the tower door is a double layer door, a first door of the double layer door is a full-open door, a second door of the double layer door is an airtight door; the full-open door forms the air outlet, and a passageway is defined by a top portion and side walls of the full-open door and the airtight door and is in communication with the air outlet.

4. The tower bottom cooling device for the wind turbine according to claim 3, wherein the heat sink and the first fan are arranged in the lower space below the layering platform.

5. The tower bottom cooling device for the wind turbine according to claim 4, wherein the first fan comprises two or more fans arranged side by side, and air outlets of the first fans are respectively connected to a lower bottom surface of the double layer door via the second ventilation pipes to form passageways.

6. The tower bottom cooling device for the wind turbine according to claim 3, wherein the heat sink and the first fan are arranged in an upper space above the layering platform, and a third ventilating pipe is provided between the air inlet and the heat sink.

7. The tower bottom cooling device for the wind turbine according to claim 6, wherein the air outlet of the first fan is connected to a top portion of the double layer door to form a passageway.

8. The tower bottom cooling device for the wind turbine according to claim 1, wherein a salt spray filter is provided in the bypass air duct.

9. The tower bottom cooling device for the wind turbine according to claim 8, wherein a dehumidifier and/or an electric heating device is further provided in the bypass air duct.

10. The tower bottom cooling device for the wind turbine according to claim 1, wherein the bypass air duct is provided with a first air inlet configured to communicate with the air inlet section of the main air duct, and a second air inlet configured to communicate with the air outlet section of the main air duct; the air duct switching device comprises a one-way valve, a cover plate and a motor configured to drive the cover plate by a rotating shaft, the cover plate is fixed to the rotating shaft, and the rotating shaft is connected to the motor;

in the first operating state, the one-way valve is switched on, and the motor drives the cover plate to rotate to a position for closing the second air inlet;

in the second operating state, the one-way valve is switched on, and the motor drives the cover plate to rotate to a position for closing the first air inlet; and in the third operating state, the one-way valve is switched off.

11. The tower bottom cooling device for the wind turbine according to claim 1, wherein the bypass air duct is provided with a first air inlet configured to communicate with the air inlet section of the main air duct, and a second air inlet configured to communicate with the air outlet section of the main air duct; the air duct switching device comprises a first one-way valve arranged at the first air inlet and a second one-way valve arranged at the second air inlet;

in the first operating state, the first one-way valve is switched on and the second one-way valve is switched off;

in the second operating state, the second one-way valve is switched on and the first one-way valve is switched off; and     in the third operating state, both the first one-way valve and the second one-way valve are switched off.

12. The tower bottom cooling device for the wind turbine according to claim 1, wherein the air inlet of the main air duct is configured to discharge air, to change the air inlet section of the main air duct to be the air outlet section, and the air outlet of the main air duct is configured to introduce air, to change the air outlet section of the main air duct to be the air inlet section.

13. A control method for controlling the tower bottom cooling device for the wind turbine according to claim 1, a temperature sensor being provided at a water inlet of the heat sink, and the control method comprising:

turning off the first fan when $T_{(water,\ in)}$ is lower than a set temperature value; and     starting the first fan when $T_{(water,\ in)}$ is higher than a set temperature value; and     wherein the $T_{(water,\ in)}$ is a temperature value measured by the temperature sensor.

14. A control method for controlling the tower bottom cooling device for the wind turbine according to claim 1, a temperature sensor and a humidity sensor being arranged in a space at the bottom of the tower to which the bypass air duct opens, the control method comprising:

when T is higher than a set temperature value, switching the air duct switching device to introduce cold air from the air inlet section of the main air duct, filtering the cold air, and supplying the filtered cold air to an internal environment of the tower to cool the internal environment of the tower;

when RH is higher than a set relative humidity value and T is lower than a set temperature value, switching the air duct switching device to introduce hot air from the air outlet section of the main air duct, filtering the hot air, and supplying the filtered hot air to the internal environment of the tower, to reduce a relative humidity of the internal environment of the tower; and     when RH is higher than a set relative humidity value and T is higher than a set temperature value, switching the air duct switching device to introduce cold air from the air inlet section of the main air duct, filtering the cold air, and supplying the filtered cold air to the internal environment of the tower, to cool the internal environment of the tower and reduce the relative humidity of the internal environment of the tower; and     wherein T is a value measured by a single temperature sensor or a maximum value among values measured by a plurality of temperature sensors, and RH is a value measured by a single humidity sensor or a maximum value among values measured by a plurality of humidity sensors.

\* \* \* \* \*